United States Patent [19]

Moreno et al.

[11] Patent Number: 4,811,991

[45] Date of Patent: Mar. 14, 1989

[54] TIRE RIM PROTECTOR FOR CLEANING AND APPLYING A LIQUID PROTECTANT TO TIRES

[76] Inventors: Ernie A. Moreno; Ray D. Moreno, both of 1305 Woodale Ct., San Jose, Calif. 95127

[21] Appl. No.: 83,050

[22] Filed: Aug. 10, 1987

[51] Int. Cl.$^4$ .................. B60B 7/00; B05C 11/00
[52] U.S. Cl. .................... 301/37 R; 118/505
[58] Field of Search ............ 301/37 R, 37 SC, 37 SS, 301/37 SA, 37 S, 37 CP, 37 P, 37 T, 37 ST, 37 CM; 118/505, 504; 150/52 K; 156/247; 152/DIG. 12; 40/587

[56] References Cited

U.S. PATENT DOCUMENTS 2,627,839  2/1953  Hudgins et al. ................ 118/505

Primary Examiner—James B. Marbert
Attorney, Agent, or Firm—Rosenblum, Parish & Bacigalupi

[57] ABSTRACT

A tire rim protector for masking the tire rim while applying a liquid protectant to the rubber portion of the tire. The protector has a handle for maneuvering it and maintaining it in place while applying the protectant. A holder for a protectant applicator may be included on the outer surface of the protector, and a protectant applicator may be included within the holder.

15 Claims, 5 Drawing Sheets 4,811,991

TIRE RIM PROTECTOR FOR CLEANING AND APPLYING A LIQUID PROTECTANT TO TIRES

CROSS REFERENCE TO PATENT DISCLOSURE DOCUMENT

This patent application is related to disclosure No. 167717 filed April 6, 1987.

BACKGROUND OF THE INVENTION

1. Field of the Invention

The present invention relates to devices for the masking of a portion of an object while cleaning another portion thereof and more particularly to a device for masking or protecting a tire rim while applying a rubber protectant to a tire.

2. Description of the Prior Art

It has become a common practice for the automobile appearance enthusiast to apply a liquid protectant to the rubber and vinyl exterior and dashboard portions of the vehicle. The liquid protectant serves to enhance the appearance of the vehicle and prolongs the lifetime of the rubber and/or vinyl surface to which it is applied. The typical liquid protectant is a light hydrocarbon compound and may currently be found in automotive stores under the trademark "ARMORALL", a trademark of the McKesson Corporation, Irvine, Calif.

A popular method for the application of the liquid protectant is from a spray bottle onto the surface to be protected. While this application method is efficient in placing a limited amount of the protectant over a broad area, it nevertheless creates a problem of overspray. That is, spraying the protectant on undesired surfaces, such as the metal tire rim when spraying the rubber tires. The evaporation of the lighter hydrocarbons from the protectant leaves an undesired oily residue on such surfaces, whereby such surfaces must be cleaned of the oily residue or, in many cases, cleaned again.

To solve the overspray problem as related to the cleaning of tires, the inventors hereof have developed a tire rim protector which masks the tire rim during the application of the protectant. The inventors are aware of no prior art which solves this problem.

SUMMARY OF THE INVENTION

It is an object of the present invention to provide a tire rim protector which masks the tire rim from overspray during the application of a protectant.

It is another object of the present invention to provide a tire rim protector which is easy to hold with one hand while applying the protectant with the other hand.

It is a further object of the present invention to provide a tire rim protector which is lightweight and easy to use.

It is yet another object of the present invention to provide a tire rim protector which incorporates a liquid protectant applicator to facilitate the application of the liquid protectant to the tire.

It is yet a further object of the present invention to provide a tire rim protector which saves time and cost in the cleaning of tires.

The tire rim protector of the present invention includes a frustro-conical shaped cover. The diameter of the outer portion of the cone is slightly larger than the tire rim which it is designed to cover. A handle, for gripping, maneuvering and holding the protector in place, is located on the smaller diameter face of the protector. In an enhanced preferred embodiment, a liquid protectant applicator and an attachment device for removably holding the applicator to the protector is provided.

It is an advantage of the present invention that it provides a tire rim protector which masks the tire rim from overspray during the application of a protectant.

It is another advantage of the present invention that it provides a tire rim protector which is easy to hold with one hand while applying the protectant with the other hand.

It is a further advantage of the present invention that it provides a tire rim protector which is lightweight and easy to use.

It is yet another advantage of the present invention that it provides a tire rim protector which incorporates a liquid protectant applicator to facilitate the application of the liquid protectant the tire.

It is yet a further advantage of the present invention that it provides a tire rim protector which saves time and cost in the cleaning of tires.

The foregoing and other objects, features, and advantages of the present invention will be apparent from the following detailed description of the preferred embodiments which make reference to the several figures of the drawing.

IN THE DRAWING

DESCRIPTION OF THE PREFERRED EMBODIMENT

Figure 1:
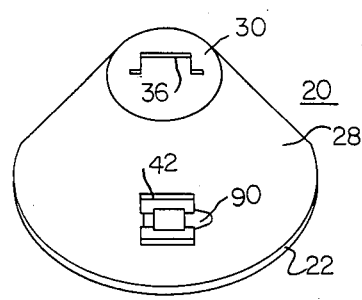
FIG. 1 is a perspective view of the tire rim protector of the present invention.
Figure 2:
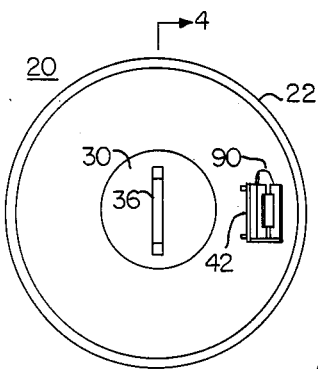
FIG. 2 is a top plan view of the device depicted in FIG. 1.
Figure 3:
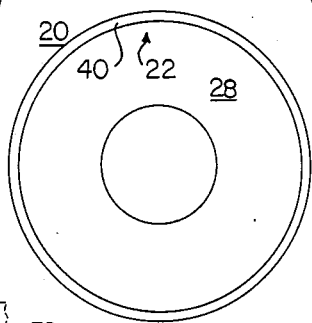
FIG. 3 is a bottom plan view of the device depicted in FIG. 1.
Figure 4:
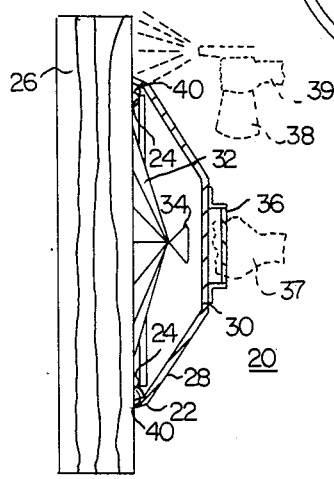
FIG. 4 is a side cross-sectional view of the device depicted in FIG. 2, taken along lines 4—4.

The tire rim protector of the present invention is utilized to cover the tire rim of a tire during the application of a liquid protectant to the tire. A preferred embodiment 20 of the present invention, as depicted in FIGS. 1, 2, 3 and 4, is basically shaped as a hollow frustro-conical shaped device. The protector 20 is circular in shape when viewed from the top, see FIG. 2, and is dimensioned to fit over a circular tire rim, as depicted in FIG. 4. The protector 20 has an outer conical lip 22 which is formed with an outer diameter that is large enough to permit it to snugly fit over the lip 24 of a tire rim of a tire 26. Because tire rims of various tires have different diameters, the outer diameter of ring portion 22 will vary in different specific applications such that the protector 20 will snugly cover the various rim diameters utilized for various-sized tires. The protector 20 has a second conically-shaped portion 28 which projects from the outer portion 22 towards a central planar disk area 30. The conically-shaped portion 28 serves to provide adequate space within the protector 20, such that the protector 20 may be utilized on tire rims with hub caps 32 which contain projecting design features, such as knock-offs 34.

The central disk-like area 30 provides a flat location for the easy attachment of a handle 36 which is utilized to grip, manipulate and hold the protector 20 in position during use. FIG. 4 depicts the protector 20 being held by the handle 36 in position by one hand 37 (shown in phantom) while the user applies a liquid protectant from a spray bottle 38 (shown in phantom) held in the user's other hand 39 (shown in phantom). To facilitate the removal of excess liquid protectant from the lip 24 of the tire rim, a band of absorbent material 40, see FIGS. 3 and 4, is engaged to the inner side of the lip 22 of the protector 20. The sponge-like absorbent material 40 is disposed between the conical rim 22 and the lip 24 of the tire rim when the device 20 is held in position as shown in FIG. 4.

It is therefore to be understood that the protector 20, when held in position on a tire rim, will protect the tire rim 24 from overspray during the application of the liquid protectant to the rubber tire. When so used, the additional work associated with removing the liquid protectant from the tire rim is avoided. The protector 20 may be rotated approximately one quarter of a turn upon the tire rim 24 when removing the protector 20 from the tire following the application of the liquid protectant. The one quarter turn serves to insure the absorption of excess liquid protectant from the tire rim and also serves to detail the lip 24 of the tire rim.

Because the preferred embodiment of the protector 20 described hereinabove is held in place with one hand, it is desirable to manufacture the device utilizing lightweight materials. Lightweight metals such as aluminum, plastics (which do not react with the liquid protectant) and even stiff cardboard are suitable materials. Each such material will produce a device which is lightweight, inexpensive and easy to use.

Figure 5:
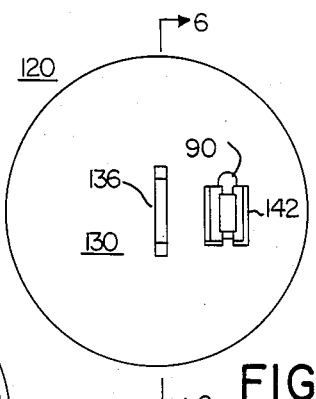
FIG. 5 is a top plan view of an alternative embodiment of the tire rim protector of the present invention.
Figure 6:
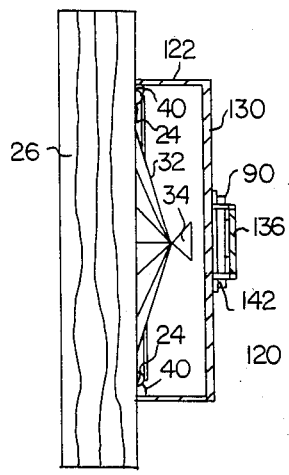
FIG. 6 is a side cross-sectional view of the device depicted in FIG. 5, taken along lines 6—6.

FIGS. 5 and 6 depict an alternative embodiment 120 of the present invention, wherein the dimensional relationships of the frustro-conical portions of the preferred embodiment are altered. It is to be understood that FIG. 5 is comparable to FIG. 2 and FIG. 6 is comparable to FIG. 4. As depicted in FIGS. 5 and 6, an outer portion 122 of the protector 120 is shaped substantially as a hollow cylinder having a diameter which is configured to snugly fit over the outer diameter of a tire rim 24. A flat disk portion 130 is engaged to the outer edge of the cylindrical portion 122 to form a hollow enclosure. The width of the cylindrical portion 122 is sufficient to encompass a hub cap 32 plus knock-off 34 within the protector 120 to permit utilization of the protector 120 on a variety of automobiles. A handle 136 is centrally located in the disk portion 130 to facilitate the utilization and manipulation of the protector 120 with one hand while the liquid protectant is sprayed on the rubber portion of the tire utilizing the second hand.

Figure 7:
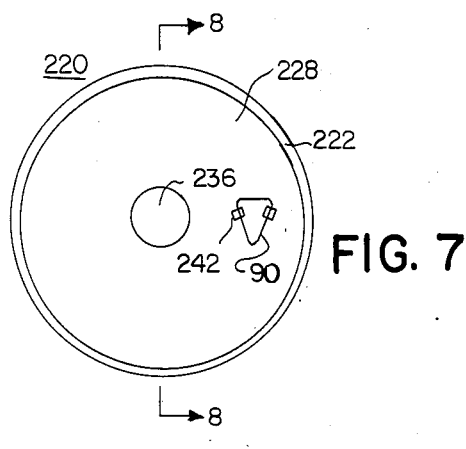
FIG. 7 is a top plan view of another alternative embodiment of the tire rim protector of the present invention.
Figure 8:
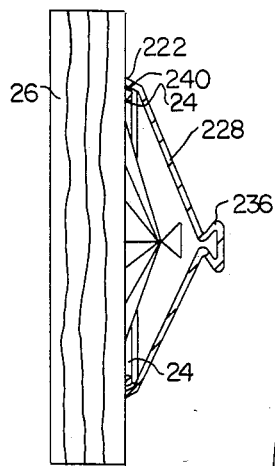
FIG. 8 is a side cross-sectional view of the device depicted in FIG. 7, taken along lines 8—8.

FIGS. 7 and 8 depict an alternative embodiment 220 of the present invention, wherein the dimensional relationships of the conical portions of the preferred embodiment are again altered. It is therefore to be realized that FIG. 7 is comparable to FIG. 2 and FIG. 8 is comparable to FIG. 4. As depicted in FIGS. 7 and 8, an outer portion 222 of the protector 220 is configured to snugly fit over the outer diameter of a tire rim 24. The outer portion 222 is substantially similar in width to the frustro-conical section 22 of the protector 20 depicted in FIGS. 2 and 4. A conically-shaped portion 228 extends from the outer portion 222 inwardly to an apex which is integrally formed as a handle 236. As with the protector 20 of FIGS. 2 and 4, the protector 220 of FIGS. 7 and 8 is designed to encompass a hub cap 32 and knock-off 34 therewithin and to be held by the user in one hand while the liquid protectant is sprayed on the rubber portion of the tire utilizing the second hand.

While the basic configuration of the preferred embodiments of the protector has been shown with reference to three specific devices 20, 120 and 220, it will be understood by those skilled in the art that the teachings hereof encompass all such conical and frustro-conical shapes that will serve the purpose of snugly fitting over the tire rim to protect it from overspray.

Figure 9:
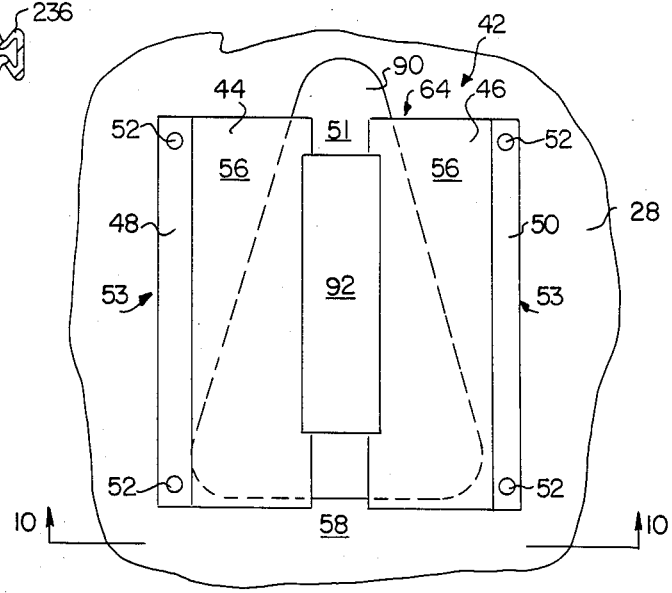
FIG. 9 is a top plan view of an applicator holder of the present invention as depicted in FIGS. 1 and 2, having a triangularly-shaped applicator shown engaged therewithin.
Figure 11:
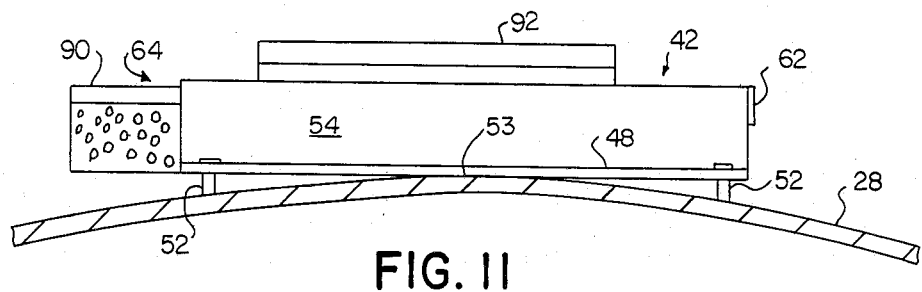
FIG. 11 is a side elevational view of the applicator holder depicted in FIG. 10, taken along lines 11—11 thereof.
Figure 10:
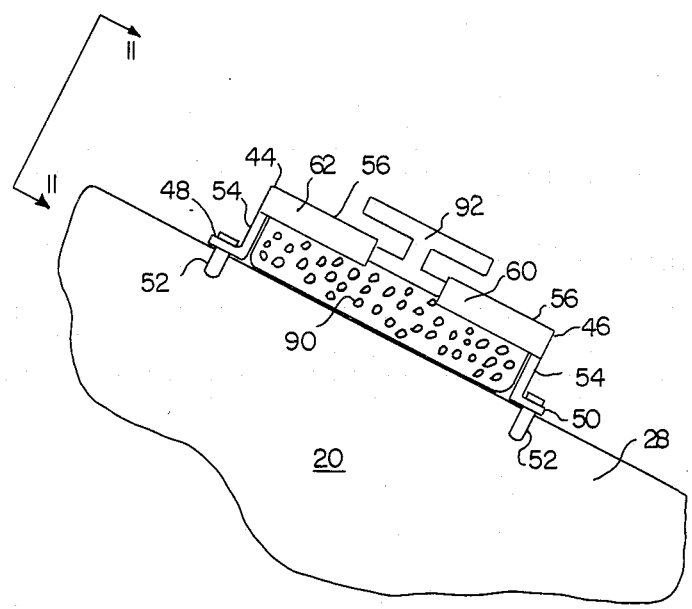
FIG. 10 is an end elevational view of the applicator holder depicted in FIG. 9.

An enhanced version of the preferred embodiment of the present invention includes a liquid protectant applicator 90 which is attached to the protector 20, 120 or 220. In the preferred embodiment depicted in FIGS. 1 and 2, the applicator 90 is engaged to the protector 20 utilizing an applicator holder 42. FIGS. 9, 10 and 11 depict the applicator 90 and applicator holder 42 of FIGS. 1 and 2 in greater detail. As depicted in FIGS. 9, 10 and 11, the applicator holder 42 consists of two sections 44 and 46 formed of sheet-like material. Each section 44 and 46 is formed with an outer edge 48 and 50 respectively which are disposed for engagement with the curved, conical surface 28 of the protector 20. As is best depicted in FIGS. 10 and 11, a short, peg-like leg 52 is engaged to each end of the outer edges 48 and 50 for engagement with the curved, conical surface 28. Each leg 52 is fixedly engaged to its respective outer edge and depends outwardly therefrom to a firm engagement with the conical surface 28. When the holder 42 is thus engaged with the conical surface 28, the outer edges 48 and 50 make contact with the conical surface 28 proximate the mid-points 53 thereof. Each portion 44 and 46 of the holder 42 is configured to create a pocket-like holder therebetween, such that a slot 51 is situated between the portions 44 and 46, whereby the handle 92 of the applicator 90 protrudes through the slot 51 and is accessible to the user. To create such a pocket-like holder, each portion 44 and 46 is formed with a relatively short rising portion 54 and a somewhat longer linearly extending portion 56. To close the rearward end 58 of the pocket-like cavity, the rearward edges 60 and 62 are bent downwardly to prevent the applicator 90 from slipping out of the pocket-like holder 42. The frontward edge 64 of the holder 42 remains open such that the applicator 90 may be slid through the opening 64 and into the applicator holder 42.

Figure 12:
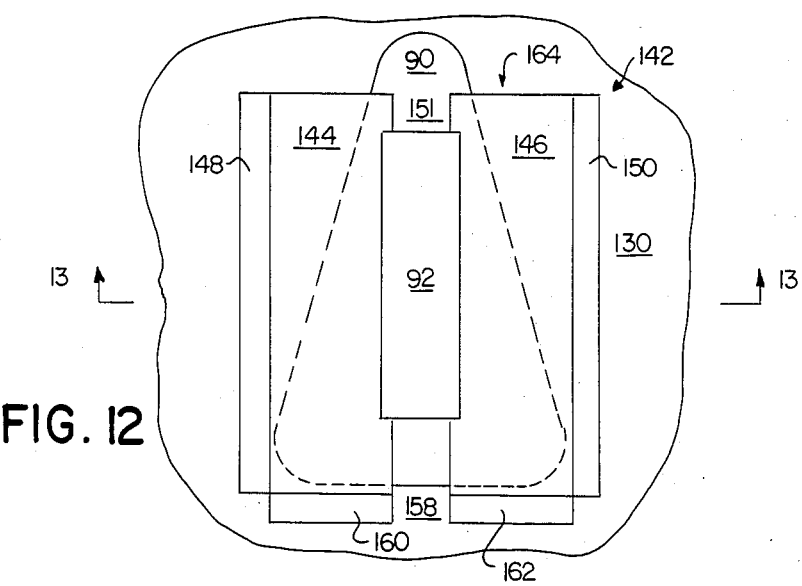
FIG. 12 is a top plan view of an applicator holder of the alternative embodiment of the present invention as depicted in FIGS. 5 and 6, having a triangularly-shaped applicator shown engaged therewithin.
Figure 13:
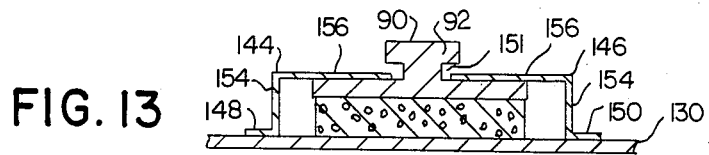
FIG. 13 is an end cross-sectional view of the applicator holder depicted in FIG. 12, taken along lines 13—13.

As is seen with the aid of FIGS. 12 and 13, in the second preferred embodiment 120, an applicator holder 142 for the applicator 90 consists of two sections 144 and 146 formed of sheet-like material, each of which is affixed to the flat area 130 of the protector 120 at an outer edge 148 and 150 respectively thereof. As is best seen in FIG. 13, each portion 144 and 146 of the holder 142 is configured to create a pocket-like holder therebetween, such that a slot 151 is situated between the portions 144 and 146, whereby the handle 92 of the applicator 90 protrudes through the slot 151 and is accessible to the user. To create such a pocket-like holder, each portion 144 and 146 is formed with a relatively short rising portion 154 and a somewhat longer linearly extending portion 156. To close the rearward end 158 of the pocket-like cavity, the lower edges 160 and 162 of the portions 144 and 146 respectively of the holder are also bent downwardly and joined to the flat portion 130 of the protector 120. It is therefore to be realized that a slotted pocket-like cavity, having side edges 148 and 150 and rearward edges 160 and 162 joined to the platform 130 has been created. The frontward edge 164 of the pocket remains unengaged to the platform 130 and open, such that the applicator 90 may be slid through the opening 164 and into the applicator holder 142.

Figure 14:
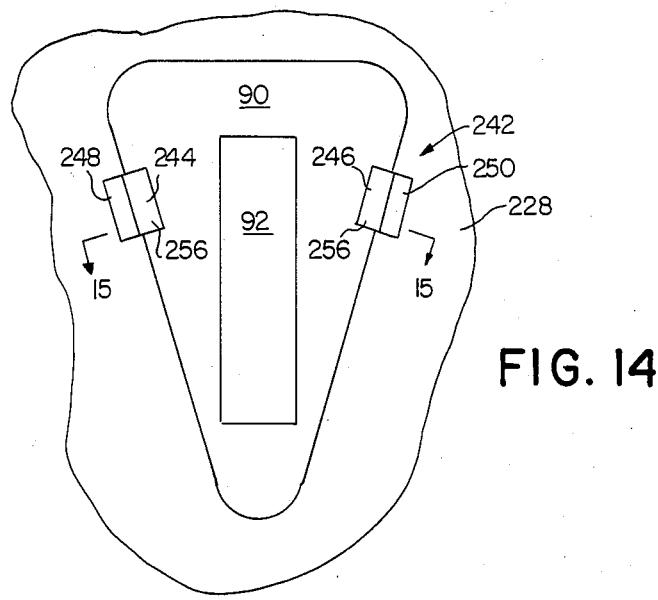
FIG. 14 is a top plan view of an applicator holder of the alternative embodiment of the present invention as depicted in FIGS. 7 and 8, having a triangularly-shaped applicator shown engaged therein.
Figure 15:
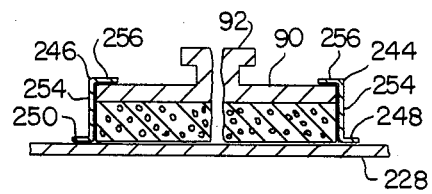
FIG. 15 is a side cross-sectional view of the applicator holder depicted in FIG. 14, taken along lines 15—15 thereof.

As depicted in FIGS. 14 and 15, the applicator holder 242 of the protector 220 is formed utilizing two relatively short pieces of sheet-like material 244 and 246 which are joined to the conical section 228 of the protector 220 at an edge 248 and 250 respectively thereof. Each portion 244 and 246 of the holder 242 is formed with a rising portion 254 and a lateral portion 256 which serves to hold the applicator 90 snugly in position when the applicator is inserted between the two portions 244 and 246 of the holder 242. As is best seen in FIG. 14, the two portions 244 and 246 are angularly disposed relative to one another, such that the applicator 90 may be forceably inserted therewithin to achieve a snug fit.

It is therefore to be understood that the applicator holder of the present invention may be disposed either upon a conical portion 28 or 228 of protectors 200 and 220 respectively or upon the flat portion 130 of a protector 120. It is to be further realized that similar types of applicator holders, which do not depart from the spirit of the present invention are within the contemplation of the invention.

Figure 17:
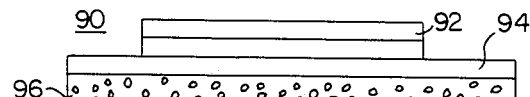
FIG. 17 is a side elevational view of the device depicted in FIG. 16.
Figure 16:
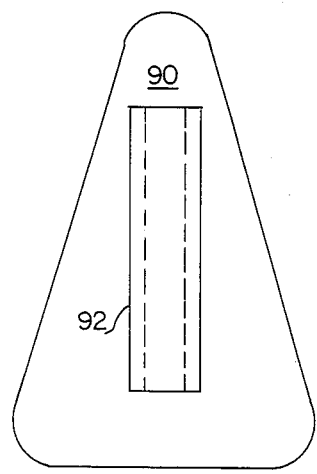
FIG. 16 is a top plan view of a protectant applicator of the present invention.
Figure 18:
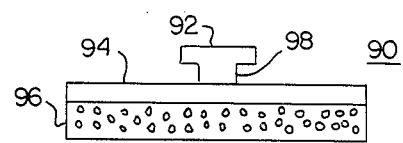
FIG. 18 is an end elevational view of the device depicted in FIG. 16.

FIGS. 16, 17 and 18 depict the preferred embodiment of the protectant applicator of the present invention. As depicted in FIGS. 16, 17 and 18 the protectant applicator 90 of the present invention is triangularly shaped in top view. As is best seen in FIGS. 17 and 18, the applicator 90 is formed with a relatively inflexible base 94 from which rises a handle 92. A sponge material 96, for applying and absorbing liquid protectant is bonded to the lower side of the base 94. The handle 92 of the applicator 90 is relatively long and narrow in configuration for ease of gripping. A necked portion 98 of the handle 92 is provided for a loose engagement within slot 51 or 151, such that the handle 92 will project through the slot 51 or 151 of the applicator holders 42 and 142 respectively. It is to be realized that the applicator 90 can be shaped other than triangularly, such as rectangularly or as an oval or a disk.

The applicator 90 is principally utilized following the application of liquid protectant from a spray bottle as previously described. Following the application of the protectant utilizing the spray bottle, the user withdraws the applicator 90 from the holder 42, 142 or 242 and utilizes the applicator 90 to spread the liquid protectant uniformly throughout the rubber portion of the tire to achieve a thorough application of the protectant to the tire. During this process the protector 20, 120 or 220 is held in position by the user's grip on the protector handle 36, 136 or 236, such that the liquid protectant is not applied to the tire rim. Following the utilization of the applicator to spread the liquid protectant, which also results in the sponge material absorbing excess protectant, the applicator 90 is returned to the applicator holder 42, 142 or 242 and the tire rim protector 20, 120 or 220 is removed from the tire.

While the invention has been particularly shown and described with reference to certain preferred embodiments, it will be understood by those skilled in the art that various alterations and modifications in form and detail may be made therein. Accordingly, it is intended that the following claims cover all such alterations and modifications as may fall within the true spirit and scope of the invention.

What I claim is:

1. A tire rim protector for masking a tire rim while cleaning or applying a liquid protectant to the rubber portion of a tire, comprising: a hollow member, said member being defined by thin walls having an outer surface and defining an inner space therewithin; a first opening formed in said walls, said opening being circular and having an outer diameter that is slightly larger than the diameter of the tire rim which said member is designed to mask; a handle being engaged with said outer surface of said walls and disposed to facilitate the gripping and maneuvering of said member;

said walls of said member being formed in a frustroconical shape such that a first portion of said walls is conically shaped and a second portion of said walls is disk shaped and wherein said handle is engagably disposed upon said disk-shaped portion;

said frustro-conically-shaped member including an outer substantially conically-shaped portion formed for engaging said tire rim and an inner conically-shaped portion, and wherein said outer portion is formed having a more acute apex angle than the apex angle of said inner portion; and an applicator holder means being fixedly engaged to the outer surface of said member and an applicator being removably engagable within said holder.

2. A device as described in claim 1 wherein said applicator holder is composed of two clamping portions, each said clamping portion being fixedly engaged to said member and disposed relative to one another such that said applicator may be engageably inserted therebetween.

3. A device as recited in claim 2 wherein said applicator holder is engaged to said flat, disk-like portion of said member.

4. A device as recited in claim 3 wherein said applicator includes a relatively inflexibly backplate having a handle joined thereto for the manipulation of said applicator, and a liquid absorbing portion, being bonded to said baseplate and disposed relative to said baseplate to make contact with liquid cleaners, and wherein the thickness of said baseplate and said absorbent material is formed to facilitate the releasable engagement of said applicator within said holder.

5. A device as described in claim 4 wherein said applicator holder is formed with a slot therewithin for mating engagement with said handle of said applicator, and said handle of said applicator is formed with a necked-in portion thereof to facilitate engagement within said slot of said applicator holder.

6. A tire rim protector for masking a tire rim while cleaning or applying a liquid protectant to the rubber portion of a tire, comprising: a hollow member, said member being defined by thin walls having an outer surface and defining an inner space therewithin; a first opening formed in said walls, said opening being circular and having an outer diameter that is slightly larger than the diameter of the tire rim which said member is designed to mask; a handle being engaged with said outer surface of said walls and disposed to facilitate the gripping and maneuvering of said member;

said walls of said member being formed in a cylindrical shape such that a first portion of said walls is shaped as a hollow cylinder and wherein said first opening is formed in one end of said cylinder, perpendicular to the axis of said cylinder, said walls also having a second disk-shaped portion jointed to said cylindrically-shaped first portion; and wherein said handle is engagably disposed upon said disk-shaped portion; and an applicator holder means being fixedly engaged to the outer surface of said member and an applicator being removably engagable within said holder.

7. A device as described in claim 6 wherein said applicator holder is composed of two clamping portions, each said clamping portion being fixedly engaged to said member and disposed relative to one another such that said applicator may be engageably inserted therebetween.

8. A device as recited in claim 7 wherein said applicator holder is engaged to said inner conically-shaped portion of said member.

9. A device as recited in claim 8 wherein said applicator includes a relatively inflexible backplate having a handle joined thereto for the manipulation of said applicator, and a liquid absorbing portion,, being bonded to said baseplate and disposed relative to said baseplate to make contact with liquid cleaners, and wherein the thickness of said baseplate and said absorbent material is formed to facilitate the releasable engagement of said applicator within said holder.

10. A device as described in claim 9 wherein said applicator holder is formed with a slot therewithin for mating engagement with said handle of said applicator, and said handle of said applicator is formed with a necked-in portion thereof to facilitate engagement within said slot of said applicator holder.

11. A tire rim protector for masking a tire rim while cleaning or applying a liquid protectant to the rubber portion of a tire, comprising: a hollow member, said member being defined by thin walls having an outer surface and defining an inner space therewithin; a first opening formed in said walls, said opening being circular and having an outer diameter that is slightly larger than the diameter of the tire rim which said member is designed to mask; a handle being engaged with said outer surface of said walls and disposed to facilitate the gripping and maneuvering of said member;

said walls of said member being conically shaped, such that said walls form an apex of said conical shape and said first opening is disposed opposite to said apex; and wherein said handle is integrally formed in said walls proximate said apex of said walls;

said conically-shaped member including an outer substantially conically-shaped portion formed for engaging said tire rim and an inner conically-shaped portion, and wherein said outer portion is formed having a more acute apex angle than the apex angle of said inner portion; and an applicator holder means being fixedly engaged to the outer surface of said member and an applicator being removably engagable within said holder.

12. A device as described in claim 11 wherein said applicator holder is composed of two clamping portions, each said clamping portion being fixedly engaged to said member and disposed relative to one another such that said applicator may be engageably inserted therebetween.

13. A device as recited in claim 12 wherein said applicator holder is engaged to a curved surface portion of said conically-shaped member.

14. A device as recited in claim 13 wherein said applicator includes a relatively inflexible backplate having a handle joined thereto for the manipulation of said applicator, and a liquid absorbing portion, being bonded to said baseplate and disposed relative to said baseplate to make contact with liquid cleaners, and wherein the thickness of said baseplate and said absorbent material is formed to facilitate the releasable engagement of said applicator within said holder.

15. A device as described in claim 14 wherein said applicator holder is formed with a slot therewithin for mating engagement with said handle of said applicator, and said handle of said applicator is formed with a necked-in portion thereof to facilitate engagement within said slot of said applicator holder.

* * * * *